(12) United States Patent
Li et al.

(10) Patent No.: US 6,894,642 B2
(45) Date of Patent: May 17, 2005

(54) DOUBLY CONSTRAINED ROBUST CAPON BEAMFORMER

(75) Inventors: Jian Li, Gainesville, FL (US); Petre Stoica, Uppsala (SE); Zhisong Wang, Gainsville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 10/676,777

(22) Filed: Oct. 1, 2003

(65) Prior Publication Data

US 2005/0073457 A1 Apr. 7, 2005

(51) Int. Cl.[7] .............................. H01Q 3/26; G01S 3/80
(52) U.S. Cl. ....................................... 342/368; 367/119
(58) Field of Search ................................ 342/368–377; 367/119–123; 600/437–461; 128/915, 916

(56) References Cited

PUBLICATIONS

J. Li et al., Doubly constrained robust Capon beamformer, IEEE Transactions Signal Processing, vol. 52(9), p. 2407–2423, Sep. 2004.*
J. Li et al., Doubly constrained robust Capon beamformer, The Thirty–Seventh Asilomar Conference on Signals, Systems & Computers, vol. 2, p. 1335–1339, Nov. 2003.*
Z. Wang et al., Comparison between norm constrained and robust Capon beamformers, IEEE International Symposium on Phased Array Systems and Technology, p. 170–175, Oct. 2003.*
S. Shahbazpanahi et al., Parametric localization of multiple incoherently distributed sources using covariance fitting, Sensor Array and Multichannel Signal Processing Workshop Proceedings, p. 332–336, Aug. 2002.*
A.B. Gershman et al., Matrix fitting approach to direction of arrival estimation with imperfect spatial coherence of wavefronts, IEEE Transactions on Signal Processing, vol. 45(7), p. 1894–1899, Jul. 1997.*

Stoica et al., "Robust Capon Beamforming," IEEE Signal Processing Letters 10:172–175, 2003.
Li et al., "On Robust Capon Beamforming and Diagonal Loading," IEEE Signal Processing Letters 51:1702–1715, 2003.
Vorobyov et al., "Robust Adaptive Beamforming Using Worst–Case Performance Optimization: A Solution to the Signal Mismatch Problem," EEE Signal Processing Letters 51:313–324, 2003.
Lorenz, et al., "Robust Minimum Variance Beamforming," Information Systems Laboratory, Stanford University 1–16, Oct. 2001.
Wu et al., "A New Robust Beamforming Method With Antennae Calibration Errors," IEEE 876–872, 1999.
Marzetta, T., "A New Interpretation for Capon's Maximum Likelihood Method of Frequency–Wavenumber Spectral Estimation," IEEE Transactions on Acoustics, Speech, and Signal Processing ASSP–31:445–449, 1983.
Stoica et al., "Robust Capon Beamforming," IEEE 876–880, 2002.
Li et al., "On Robust Capon Beamforming and Diagonal Loading," ICASSP 337–340, 2003.

* cited by examiner

Primary Examiner—Thomas H. Tarcza
Assistant Examiner—F H Mull
(74) Attorney, Agent, or Firm—Akerman Senterfitt (57) ABSTRACT

A method for enhanced Capon beamforming includes the steps of providing a sensor array including a plurality of sensor elements where an array steering vector corresponding to a signal of interest (SOI) is unknown. A covariance matrix fitting relation is bounded for the unknown array steering vector by constraining the array steering vector using a constant norm and a spherical uncertainty set. The matrix fitting relation is then solved to provide an estimate of said array steering vector.

9 Claims, 12 Drawing Sheets

FIG. 1

(a) Power estimates  (b) Diagonal loading levels

(a) SINR of the first signal (b) Power estimate of the first signal (c) SINR of the second signal (d) Power estimate of the second signal

(a) SINR with $\epsilon = 0.6$ (b) Power estimate with $\epsilon = 0.6$ (c) SINR with $\epsilon = 2.0$ (d) Power estimate with $\epsilon = 2.0$ (e) SINR with $\epsilon = 3.0$ (f) Power estimate with $\epsilon = 3.0$

DOUBLY CONSTRAINED ROBUST CAPON BEAMFORMER

STATEMENT REGARDING FEDERALLY SPONSORED RESEARCH OR DEVELOPMENT

The United States Government has rights in this invention pursuant to National Science Foundation grants CCR-0104887 and ECS-0097636.

CROSS-REFERENCE TO RELATED APPLICATIONS

Not applicable.

FIELD OF THE INVENTION

The invention relates to Capon beamforming, and more specifically to an advanced Capon beamforming method and related apparatus which provides computational efficiency and power estimates for signals of interest which can be adjusted for steering vector uncertainty.

BACKGROUND

Beamforming is a ubiquitous task in array signal processing, such as for radar, sonar, acoustics, astronomy, seismology, communications, and medical imaging. The standard data-independent beamformers include the delay-and-sum approach as well as methods based on various data-independent weight vectors for sidelobe control. The data-dependent Capon beamformer adaptively selects the respective weight vectors to minimize the array output power subject to the linear constraint that the signal of interest (SOI) does not suffer from any distortion (unity gain and no phase shift).

The Capon beamformer has better resolution and better interference rejection capability as compared to the data-independent beamformer, provided that the array steering vector corresponding to the SOI is accurately known. However, in practice the SOI steering vector is assumed, rather than being accurately known. This results in steering vector error. Steering vector error generally occurs because of differences between the assumed SOI arrival angle and the true SOI arrival angle and between the assumed array response and the true array response, such as due to array calibration errors. Whenever the SOI steering vector error becomes significant, the performance of the Capon beamformer can become worse than standard beamformers.

Many approaches have been proposed during the past three decades to improve the robustness of the Capon beamformer. To account for array steering vector errors, additional linear constraints, including point and derivative constraints, can be imposed. However, these constraints are not explicitly related to the uncertainty of the array steering vector. Moreover, for every additional linear constraint imposed, the beamformer loses one degree of freedom (DOF) for interference suppression. It has been shown that these constraints belong to the class of covariance matrix tapering approaches.

Diagonal loading (including its extended versions) has been a popular approach to improve the robustness of the Capon beamformer. The diagonal loading approaches are derived by imposing an additional quadratic constraint either on the Euclidean norm of the weight vector itself, or on its difference from a desired weight vector. Sometimes diagonal loading is also proposed to alleviate various problems of using the array sample co-variance matrix and to better control the peak sidelobe responses. However, for most of these methods, it is not clear how to choose the diagonal loading based on the uncertainty of the array steering vector.

The subspace based adaptive beamforming methods require the knowledge of the noise covariance matrix. Hence they are sensitive to the imprecise knowledge of the noise covariance matrix in addition to the array steering vector error. Making these methods robust against the array steering vector error will not cure their sensitivity to imprecise knowledge of the noise covariance matrix.

Most of the early suggested modified Capon beamforming algorithms are rather ad hoc in that the choice of parameters is not directly related to the uncertainty of the steering vector. Only recently have some Capon beamforming methods with a clear theoretical background been proposed, which, unlike the early methods, make explicit use of an uncertainty set of the array steering vector. However, even Capon methods which make explicit use of an uncertainty set of the array steering vector are computationally inefficient and cannot generally provide accurate power estimates for signals of interest.

An improved Capon beamformer method referred to as a robust Capon beamformer (RCB) is described in copending and commonly assigned U.S. application Ser. No. 10/358,597 entitled "Robust Capon Beam forming" by the same inventors as the current application. U.S. application Ser. No. 10/358,597 is hereby incorporated by reference into the current application in its entirety. The method described therein includes the steps of providing a sensor array including a plurality of sensor elements, wherein an array steering vector corresponding to a signal of interest (SOI) is unknown. The array steering vector is represented by an ellipsoidal uncertainty set. A covariance fitting relation for the array steering vector is bounded with the uncertainty ellipsoid. The matrix fitting relation is solved to provide an estimate of the array steering vector.

SUMMARY OF THE INVENTION

A method for enhanced Capon beamforming is referred to herein as "doubly constrained robust Capon beamforming" (DCRCB). The method includes the steps of providing a sensor array including a plurality of sensor elements where an array steering vector corresponding to a signal of interest (SOI) is unknown. The sensor elements can comprise antennas or ultrasound transducers.

A covariance matrix fitting relation is bounded for the unknown array steering vector by constraining the array steering vector using a constant norm constraint and a spherical uncertainty set constraint. Although a more general ellipsoidal uncertainty set can theoretically be used with the invention, the problem becomes substantially more difficult to solve as compared to a spherical uncertainty set. A matrix fitting relation is then solved to provide an estimate for the array steering vector. The Lagrange Multiplier Method is preferably used to solve the matrix fitting relation.

The method can include the step of determining the power of the SOI, including adjustment for the estimated array steering vector. The SOI power can then be used to determine a direction of arrival (DOA) of the SOI. The method can also be used to determine a weight vector for said sensor array. The method can include the step of determining a waveform of the SOI from the weight vector.

A sensor-based system includes a sensor array including a plurality of sensor elements, wherein an array steering vector corresponding to a signal of interest (SOI) is unknown. The system includes a signal processor communicably connected to the elements of the sensor array. The signal processor bounds a covariance matrix fitting relation for the array steering vector by constraining the array steering vector using a constant norm and a spherical uncertainity set, and solving said matrix fitting relation to provide an estimate of the array steering vector. The sensor system can be a radar, cellular communications, sonar or acoustic imaging system.

BRIEF DESCRIPTION OF THE DRAWINGS

A fuller understanding of the present invention and the features and benefits thereof will be accomplished upon review of the following detailed description together with the accompanying drawings, in which:

FIGS. 2(a) and (b) are power estimates and diagonal loading levels (using R) versus the steering direction θ when $\epsilon=1.0$ and $\beta=6.0$. The true powers of the incident signals from $-35°$, $-15°$, $0°$, $10°$, and $40°$ are denoted by circles, and $\epsilon_0=1.0$.

FIGS. 4(a) and (b) are power estimates versus the steering direction θ when (a) $\epsilon=0.7$ and (b) $\epsilon=1.5$, respectively. The true powers of the incident signals from $-35°$, $15°$, $0°$, $10°$, and $40°$ are denoted by circles, and $\epsilon_0=1.0$.

FIG. 5(a)–(j) compares the RCB and DCRCB approaches for each incident signal, as $\epsilon$ varies, when $\epsilon_0=1.0$.

FIG. 6(a)–(d) compares the RCB and DCRCB approaches with (a), (b) $\epsilon=1.0$ and (c), (d) $\epsilon=2.0$ when $\theta_4$ (the direction of arrival of the fourth signal) is changing from $20°$ to $60°$. The SOI power is 10 dB and $\epsilon_0=1.0$.

FIG. 7(a)–(d) compares the RCB and DCRCB approaches, as the snapshot number varies, when (a), (b) $\epsilon=0.6$ and (c), (d) $\epsilon=2.0$. The SOI power is 10 dB and $\epsilon_0=0.5603$ (corresponding to $\Delta=2.0°$).

FIG. 8(a)–(f) compares the RCB and DCRCB approaches with (a), (b), (e) $\epsilon=0.6$ and (c), (d), (f) $\epsilon=2.0$. The SOI is 10 dB and $\epsilon_0=0.5603$ (corresponding to $\Delta=2.0°$).

FIG. 9(a)–(f) compares the RCB and DCRCB approaches as SNR varies when (a), (b) $\epsilon_0=0.1474$, (c), (d) $\epsilon_0=0.5939$, and (e), (f) $\epsilon_0=1.2289$, corresponding to $\Delta=-1.0°$, $-2.0°$, and $3.0°$, respectively. The SOI power is 10 dB and $\epsilon=0.6$.

FIG. 10(a)–(f) compares the RCB and DCRCB approaches in 100 Monte-Carlo trials when (a), (b) $\epsilon=0.6$, (c), (d) $\epsilon=2.0$, and (e), (f) $\epsilon=3.0$. The direction of arrival of the fifth signal is uniformly distributed between $38°$ and $42°$ and its assumed angle is $40°$. The SOI power is 10 dB and $0 \leq \epsilon_0 \leq 0.5939$.

FIG. 11(a)–(d) compares the RCB and DCRCB approaches in the presence of potentially significant array calibration errors. The SOI power is 10 dB, and $0 \leq \epsilon_0 \leq \infty$.

DETAILED DESCRIPTION

The invention relates to an improved beamforming method and related apparatus. A method of doubly constrained robust Capon beamforming (DCRCB) includes the steps of providing a sensor array including a plurality of sensor elements, where an array steering vector corresponding to a signal of interest (SOI) is unknown. As used herein, an "unknown" steering vector refers to a condition where the array steering vector is at least not precisely known, and may not even be accurately known.

A covariance matrix fitting relation is bounded for the unknown array steering vector by constraining the array steering vector using a constant norm constraint and a spherical uncertainty set constraint. The matrix fitting relation is then solved to provide an estimate of the array steering vector. The DCRCB is a natural extension of the standard Capon beamformer (SCB), obtained via covariance matrix fitting, to the case of uncertain steering vectors by enforcing the constraints described above.

The RCB described in U.S. application Ser. No. 10/358, 597 and the DCRCB described herein are computationally more efficient and conceptually simpler than other RCBs. Improved computational efficiency which can increase processing speed and reduce hardware cost over existing methods and beamforming based systems.

Both the RCB described in U.S. application Ser. No. 10/358,597 and the DCRCB described herein address the scaling ambiguity problem, which can be very important for SOI power estimation, while the other RCBs ignore it. The difference between DCRCB described herein and the related RCB disclosed in copending U.S. Application No. 10/358, 597 entitled "Robust Capon Beamforming" by the same inventors as the current application lies in one additional constant norm constraint on the array steering vector in the former. This constraint results in the quite distinct performances between DCRCB and RCB. Examples provided herein demonstrate performance differences between the DCRCB and the RCB under several selected conditions. Generally, for a reasonably tight spherical uncertainty set of the array steering vector, the DCRCB described herein is preferred to the RCB in U.S. application Ser. No. 10/358,597 for applications requiring high SINR, while the RCB in U.S. application Ser. No. 10/358,597 is generally favored for applications requiring accurate signal power estimation.

Although this specification primarily addresses estimation of the array steering vector ($a_0$) for the SOI, the DCRCB is also described for SOI waveform estimation, direction of arrival (DOA) estimation, source localization and imaging, SOI power estimation, and weight vector determination.

To derive the DCRCB, a reformulation of the Capon beamforming problem is used, to which the uncertainty set ($\|a_o - \bar{a}\|^2 \leq \epsilon$) and the norm constraint ($\|a\|^2 = M$) is appended. Proceeding in this way a robust estimate of the signal of interest (SOI) power is directly obtained, without any intermediate calculation of a weight vector $\hat{w}$.

$$\max_{\sigma^2, a} \sigma^2 \text{ subject to } R - \sigma^2 a a^* \geq 0$$
$$\|a - \bar{a}\|^2 \leq \epsilon$$
$$\|a\|^2 = M$$

The DCRCB problem can be reduced to the following problem:

$$\min_a a^* R^{-1} a \text{ subject to } \|a - \bar{a}\|^2 \leq \epsilon$$
$$\|a\|^2 = M$$

Using $\|a\|^2 = \|\bar{a}\|^2 = M$ the following results:

$$\min_a a^* R^{-1} a \text{ subject to } Re(\bar{a}^* a) \geq M - \frac{\epsilon}{2}$$
$$\|a\|^2 = M$$

Consider first the problem without the uncertainty set:

$$\min_a a^* R^{-1} a \text{ subject to } \|a\|^2 = M$$

The solution to the above problem is the eigenvector of R corresponding to its largest eigenvalue, scaled so that
$\|\tilde{a}\|^2 = M$
However, the eigenvector of a matrix is unique only up to a scalar. Even with the normalization above, the phase of $\tilde{a}$ must be chosen so that $\tilde{a}^* \bar{a}$ is real-valued and non-negative and hence $Re(\bar{a}^* \tilde{a})$ is maximum. If it satisfies $$Re(\bar{a}^* \tilde{a}) \geq M - \frac{\epsilon}{2},$$

then it is the desired solution to the DCRCB problem and the uncertainty set is an inactive constraint. If not, i.e.,
$Re(\bar{a}^* \tilde{a}) < M - \epsilon/2$
and the following problem is solved:
$f_1(a, \check{\lambda}, \check{\mu}) = a^* R^{-1} a + \check{\lambda}(\|a\|^2 - M) + \check{\mu}(2M - \epsilon - \bar{a}^* a - a^* \bar{a})$
which can be written as:
$f_1(a, \check{\lambda}, \check{\mu}) = [a - \check{\mu}(R^{-1} + \check{\lambda}I)^{-1} \bar{a}]^* (R^{-1} + \check{\lambda}I) [a - \check{\mu}(R^{-1} + \check{\lambda}I)^{-1} \bar{a}] - \check{\mu}^2 \bar{a}^* (R^{-1} + \check{\lambda}I)^{-1} \bar{a} - \check{\lambda}M + \check{\mu}(2M - \epsilon)$
The unconstrained minimizer for the above function is given by:
$\check{a}_{\check{\lambda}\check{\mu}} = \check{\mu}(R^{-1} + \check{\lambda}I)^{-1} \bar{a}$
Thus:
$f_2(\check{a}_{\check{\lambda}\check{\mu}} \check{\lambda} \check{\mu}) = \check{\mu} \bar{a}^* (R^{-1} + \check{\lambda}I)^{-1} \bar{a} - \check{\lambda}M + \check{\mu}(2M - \epsilon) \leq a^* R^{-1} a$
for any $a \in \check{S}$
Differentiation of the above function with respect to $\check{\mu}$ gives $$\hat{\check{\mu}} = \frac{2M - \epsilon}{2\bar{a}^*(R^{-1} + \check{\lambda}I)^{-1}\bar{a}}$$

$$f_3\left(\hat{\check{a}}_{\check{\lambda},\hat{\check{\mu}}}, \check{\lambda}, \hat{\check{\mu}}\right) = -\check{\lambda}M + \frac{\left(M - \frac{\epsilon}{2}\right)^2}{\bar{a}^*(R^{-1} + \check{\lambda}I)^{-1}\bar{a}}$$

Differentiation of the above function with respect to $\check{\mu}$ gives:
$\check{h}(\hat{\check{\lambda}}) = \rho$
where:

$$\hat{h}(\hat{\check{\lambda}}) = \frac{\bar{a}^*(R^{-1} + \hat{\check{\lambda}}I)^{-2}\bar{a}}{\left[\bar{a}^*(R^{-1} + \hat{\check{\lambda}}I)^{-1}\bar{a}\right]^2}$$

and:

$$\rho = \frac{M}{\left(M - \frac{\epsilon}{2}\right)^2}$$

It can be shown that $\check{h}(\hat{\check{\lambda}})$ is a monotonically decreasing function of $\check{\lambda}$, which can be obtained efficiently via several methods, such as Newton's method. Then, the following is obtained:

$$\hat{a} = \left(M - \frac{\epsilon}{2}\right)\frac{\left(R^{-1} + \hat{\check{\lambda}}I\right)^{-1}\bar{a}}{\bar{a}^*\left(R^{-1} + \hat{\check{\lambda}}I\right)^{-1}\bar{a}}$$

and:

$$\check{w} = \frac{R^{-1}\hat{a}}{\hat{a}R^{-1}\hat{a}}$$

$$= \left(M - \frac{\epsilon}{2}\right)\left[\bar{a}^*\left(R + \frac{1}{\hat{\check{\lambda}}}I\right)^{-1} R\bar{a}\right]\frac{\left(R + \frac{1}{\hat{\check{\lambda}}}I\right)^{-1}\bar{a}}{\bar{a}^*\left(R + \frac{1}{\hat{\check{\lambda}}}I\right)^{-1}R\left(R + \frac{1}{\hat{\check{\lambda}}}I\right)^{-1}\bar{a}}$$

The DCRCB weight vector ($\check{w}$) has the form of diagonal loading except for the real-valued scaling factors as well as the diagonal loading level being possibly negative. However, the scaling factor is not generally important since the quality of the SOI waveform estimate is typically expressed by the signal-to-interference-plus-noise ratio (SINR).

$$SINR = \frac{\sigma_0^2 |\check{w}^* a_0|^2}{\check{w}^* \left(\sum_{k=1}^{K} \sigma_k^2 a_k a_k^* + Q\right)\check{w}}$$

Due to the norm constraint on the steering vector, the constraint set in the DCRCB problem is no longer convex. To focus on the convex optimization problem, which is considered to be one of the simplest classes of optimization problems, the RCB algorithm was developed. RCB is an approximate solution to the DCRCB problem by first finding a solution for the problem by ignoring the norm constraint and later imposing it on the solution. More specifically, the RCB is derived by first solving the following optimization problem:

$$\min_a a^* R^{-1} a \text{ subject to } \|a - \bar{a}\|^2 \leq \epsilon$$

After $\check{a}$ is obtained, the norm constraint $\|a\|^2 = M$ is imposed when estimating the SOI power as:

$$\hat{\sigma}_0^2 = \frac{\|\check{a}\|^2}{M\check{a}^* R^{-1}\check{a}}$$

$$= \frac{\bar{a}^* U\left(I + \hat{\check{\lambda}}\Gamma\right)^{-2}\Gamma^2 U^*\bar{a}}{M\bar{a}^* U\left(I + \hat{\check{\lambda}}\Gamma\right)^{-2}\Gamma U^*\bar{a}}$$

Even though the RCB is an approximate solution to the original problem, numerical examples presented in application Ser. No. 10/358,597 demonstrate its excellent performance. Moreover, the spherical uncertainty can be readily generalized to both non-degenerate and flat ellipsoidal uncertainty sets for RCB. It is, however, not as easy to generalize to the case of ellipsoidal uncertainty sets for DCRCB, which requires a two-dimensional search to determine the Lagrange multipliers.

In many applications, such as in communications or global positioning, the focus is on SOI waveform estimation.

As demonstrated below, the weight vector can first be obtained from the steering vector estimate provided by the DCRCB. The weight vector can then be used to weigh the array output to obtain the desired SOI waveform estimate.

Let $s_o(n)$ denote the waveform of the SOI. Then, once the estimated SOI steering vector is obtained with the DCRCB, $s_o(n)$ can be estimated as in the SCB as follows:

$$\hat{s}_o(n) = \check{w}^* x_n$$

where $\hat{a}$ in:

$$\hat{a} = \left(M - \frac{\epsilon}{2}\right) \frac{\left(R^{-1} + \hat{\check{\lambda}} I\right)^{-1} \bar{a}}{\bar{a}^* \left(R^{-1} + \hat{\check{\lambda}} I\right)^{-1} \bar{a}}$$

is used in lieu of $a_o$ in $$w_0 = \frac{R^{-1} a_0}{a_0^* R^{-1} a_0}$$

to obtain $\check{w}$:

$$\check{w} = \frac{R^{-1} \hat{a}}{\hat{a}^* R^{-1} \hat{a}}$$

$$= \left(M - \frac{\epsilon}{2}\right) \left[\bar{a}^* \left(R + \frac{1}{\check{\lambda}} I\right)^{-1} R \bar{a}\right] \frac{\left(R + \frac{1}{\check{\lambda}} I\right)^{-1} \bar{a}}{\bar{a}^* \left(R + \frac{1}{\check{\lambda}} I\right)^{-1} R \left(R + \frac{1}{\check{\lambda}} I\right)^{-1} \bar{a}}$$

Note that the DCRB weight vector ($\check{w}$) also has the form associated with the diagonal loading approach, except for the real-valued scaling factor in the equation above as well as the fact that the diagonal loading level in this equation can be negative. However, the scaling factor is not generally significant since the quality of the SOI waveform estimate is typically measured by the signal-to-interference-plus-noise ratio (SINR):

$$SINR = \frac{\sigma_0^2 |\check{w}^* a_0|^2}{\check{w}^* \left(\sum_{k=1}^{K} \sigma_k^2 a_k a_k^* + Q\right) \check{w}}$$

which is independent of the scaling of the weight vector ($\check{w}$).

The DCRCB can also be used to obtain the power estimate corresponding to each direction angle or each coordinate in a two- or three-dimensional space. The power estimates can be used for DOA estimation, source localization, and imaging. The power estimates as a function of the two- or three-dimensional coordinate are two- or three-dimensional images, respectively.

A wide variety of improved systems can be based on the invention, particularly wherever high signal-to-interference-plus-noise-ratios (SINRs) and/or accurate power estimates are desired and there is some uncertainty in the array steering vector and/or the snapshot number is limited. The knowledge of the SOI steering vector can be imprecise, which is often the case in practice. Whenever this happens, the performance of the standard Capon beamformer may become worse than that of the standard data-independent beamformers.

The DCRCB can be used to cure this problem and the power estimates are much more accurate. In addition, high signal-to-interference-plus-noise-ratios (SINRs) can be achieved. Furthermore, the DCRCB can work even when the number of snapshots is less than the number of the elements in an array. Thus, the invention is expected to directly replace some data-independent beamforming methods which have marginal performance for interference suppression, and some data-dependent methods which are sensitive to the steering vector mismatch.

Figure 1:
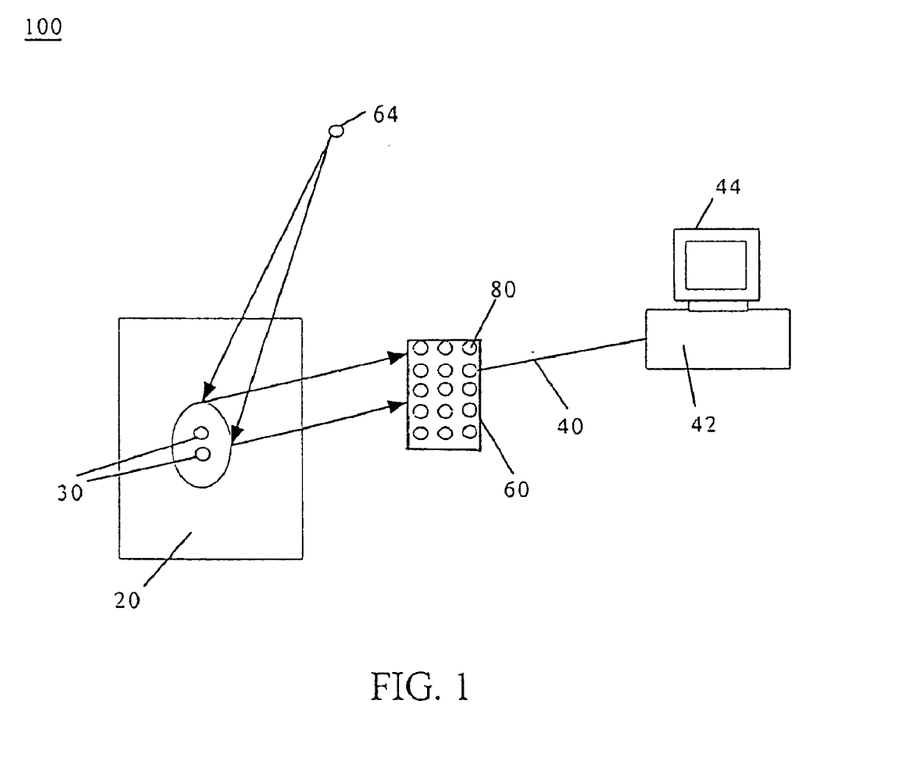
FIG. 1 is a diagram of an ultrasound imaging system which includes an advanced signal processor, according to an exemplary embodiment of the invention.

In the exemplary embodiment shown in FIG. 1, a 3D ultrasound imaging system 100 according to the invention is shown. An object 20 is irradiated by a source 64 which emits ultrasound. Structures 30 within the object 20 reflect the ultrasound waves in different directions. The reflected ultrasound waves are captured by a plurality of discrete sensors 80 of 2D or 3D-sensor array 60. Output signals of the sensors 80 are transmitted via a suitable communication link 40 to a processing unit 42, such as a conventional computer workstation for processing. Reconstructed images can then be displayed by display 44. High resolution images and compact design of the multidimensional sensor array 60 and the processing unit 42 are made possible using the advanced DCRCB process according to the present invention.

Improved adaptive array antennas based on the invention can be used in various mobile communication systems including base-mobile, indoor-mobile, satellite-mobile, and satellite-satellite communication systems. They can help improve the system performance by increasing channel capacity and spectrum efficiency, extending range coverage, tailoring beam shape and steering multiple beams to track a large plurality of mobile units. Furthermore, such systems can reduce multi-path fading, co-channel interference, system complexity and cost, as well as the bit error rate.

The invention can also be used for improved Global Positioning Systems (GPS). In GPS applications, the navigation signals transmitted from satellites generally have low power and very strong interferences may co-exist with the navigation signals. In addition, multi-path is introduced by the environment. Consequently, severe performance degradation may occur. Adaptive arrays according to the invention can be used to achieve a high signal-to-interference-plus-noise ratio (SINR) and accordingly improve the positioning accuracy of GPS.

The invention can also be used for improved Quadrupole Resonance (QR) explosive detection and Magnetic Resonance Imaging (MRI). Improved adaptive arrays can also be used to obtain high-resolution images for the target detection and parameter estimation as well as interference suppression. Adaptive arrays can also be used to obtain more accurate power estimates of acoustic sources in the presence of interferences and noise within a reverberant environment.

The invention can also be used for improved radar and sonar. Regarding radar and sonar, very strong jammers and clutter may be present. Adaptive arrays according to the invention can be used to improve the SINR and obtain high-resolution imaging results.

The invention can also be used for improved speech enhancement. For example, in a conference room, the desired speech signal from the mouth of a talker may be corrupted by interfering signals such as other talkers and room reverberation. By exploiting adaptive arrays based on the invention, a higher-quality speech signal can be obtained.

The invention can also be used for speech source localization and tracking. In this embodiment, improved adaptive arrays can be used to locate and track one or more speaking sources. The speaker location estimates can be employed to steer a camera or a series of cameras and frame the active speaker in a video-conference system.

The invention can be used for improved hearing aids. Adaptive arrays can be used to reduce the effect of background noise and interferences to significantly improve the speech understanding of the hearing impaired and to increase their overall satisfaction with the hearing aid device.

The invention also has applications with automobiles. For example, in many countries and regions hand-held telephony in cars is prohibited by legislation. The advantages of hand-free telephones in cars are safety and convenience. However, by installing the microphone far away from the user, poor sound quality and acoustic echoes may occur. Improved adaptive arrays according to the invention can be used in cars for improved speech enhancement, echo cancellation and reverberation suppression.

EXAMPLES

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

Numerical examples are provided in this section to compare the performances of the delay-and-sum beamformer, SCB, NCCB, RCB and the DCRCB according to the present invention. In all of the examples considered below, a uniform linear array with M=10 sensors and half-wavelength sensor spacing is assumed having a spatially white Gaussian noise covariance matrix given by Q=I.

For NCCB, $$\zeta = \frac{\beta}{M},$$

where $\beta(\beta \geq 1)$ is set as a user parameter. The larger the $\beta$, the closer NCCB is to SCB. On the other hand, the smaller the $\beta$, the closer NCCB is to the delay-and-sum beamformer. When $\beta=1$, the NCCB becomes the delay-and-sum beamformer and hence it uses the assumed array steering vector divided by M as the weight vector. The true steering vector error $\epsilon_0 = \min_\alpha \|a_0 e^{j\alpha} - \bar{a}\|^2$ is defined, where $a_0$ is the true steering vector and $\bar{a}$ is the assumed one. Unless otherwise stated, the beamforming methods are used with the theoretical array covariance matrix R.

First, an imaging example is considered where the incident signal power as a function of the signal arrival angle θ relative to the array normal is to be determined. It is assumed that there are five incident signals with powers 30, 60, 40, 35, and 10 dB from directions −35°, −15°, 0°, 10°, and 40°, respectively. To simulate the array calibration error (the sensor amplitude and phase error as well as the sensor position error), each element of the steering vector for each incident signal is perturbed with a zero-mean circularly symmetric complex Gaussian random variable normalized so that $\epsilon_0=1.0$. The perturbing Gaussian random variables are independent of each other. For RCB and DCRCB, $\epsilon=1.0$ is used. For NCCB, =6.0 is chosen so that the peak widths of the NCCB and DCRCB are about the same. FIG. 2(a) shows the signal power estimates as functions of the arrival angle θ obtained via using the delay-and-sum beamformer, SCB, NCCB and DCRCB methods. The small circles in the figure denote the true (direction of arrival, power)-coordinates of the five incident signals. Since the power estimates of RCB and DCRCB are almost the same for this example, only the DCRCB power estimates are shown in the figure. Note that SCB can give good direction-of-arrival estimates for the incident signals based on the peak locations. However, the SCB estimates of the incident signal powers are significantly off. The NCCB is more robust than SCB but still substantially underestimates the signal powers. On the other hand, the DCRCB according to the invention provides excellent power estimates of the incident sources. As expected, the delay-and-sum beamformer has poorer resolution than the other beamformers. Moreover, the sidelobes of the former result in false peaks.

FIG. 2(b) shows the diagonal loading levels of the NCCB, RCB and DCRCB approaches. The NCCB can have a nonzero or zero diagonal loading level. This results in the discontinuities in the NCCB diagonal loading level curve. The discontinuity in the DCRCB diagonal loading level curve is shown always around the strongest signal. As a result, DCRCB is no longer a diagonal loading approach around the strongest signal.

Figure 3:
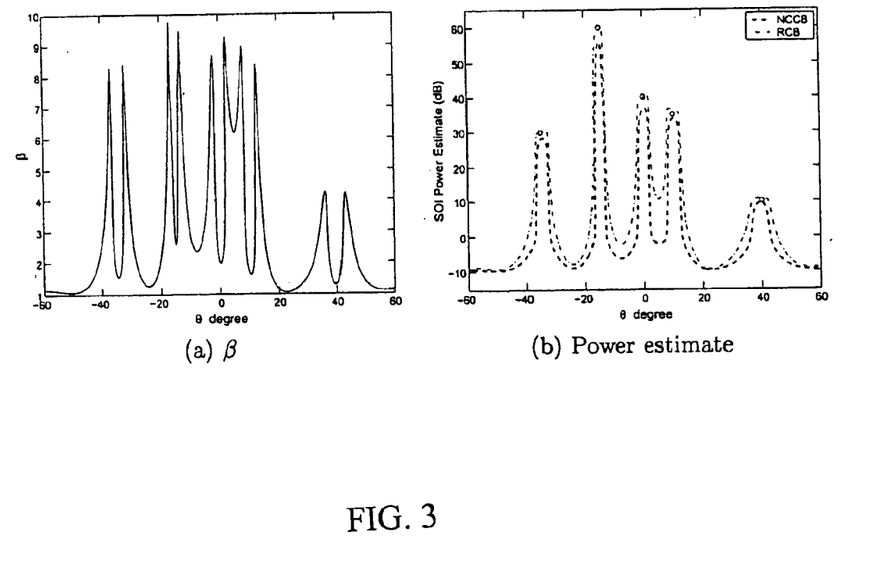
FIG. 3(a) shows for each steering direction θ, β being chosen to make NCCB have the same diagonal loading levels as RCB with $\epsilon=1.0$.
FIG. 3(b) are power estimates versus the steering direction θ via the RCB and NCCB approaches. For the RCB, $\epsilon=1.0$. For the NCCB, β is chosen as in FIG. 3(a). The true powers of the incident signals from $-35°$, $-15°$, $0°$, $10°$, and $40°$ are denoted by circles, and $\epsilon_0=1.0$.

For each steering angle θ in FIG. 3(a), $\beta$ is chosen to make NCCB have the same diagonal loading level as RCB when $\epsilon=1.0$ is used in RCB. Note that for NCCB and RCB to have the same diagonal level, $\beta$ must be chosen in a complicated manner depending on both $\epsilon$ and the data itself. FIG. 3(b) shows the signal power estimates as functions of θ obtained via using NCCB and RCB with the $\beta$ in NCCB chosen so that NCCB and RCB have the same diagonal loading levels. It is noted that the RCB signal power estimates are much more accurate than those obtained using NCCB and hence the norm constraint imposed on $\check{a}$ is very helpful for accurate SOI power estimation.

Figure 2:
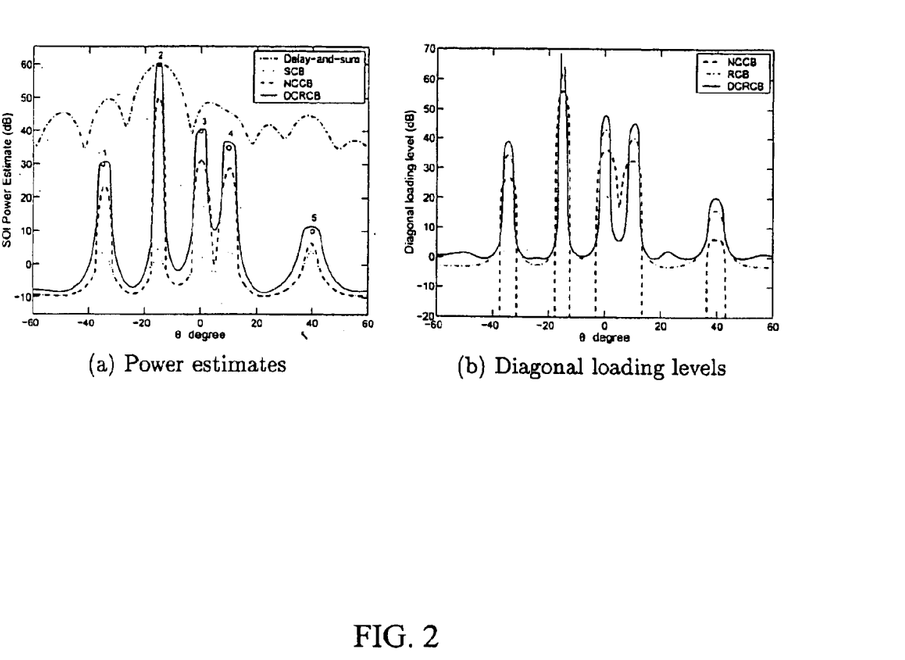
Figure 4:
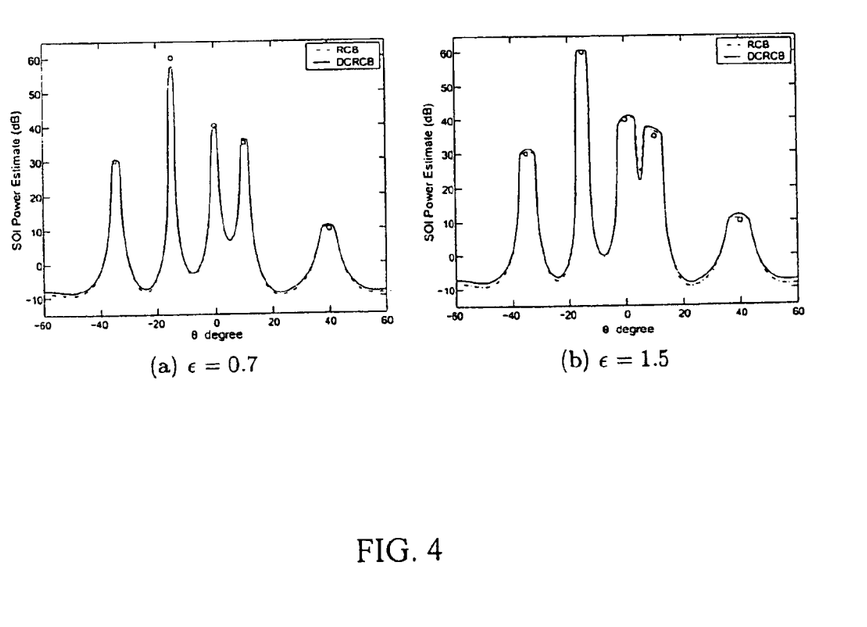

FIGS. 4(a) and 4(b) show the power estimates as functions of θ obtained via using RCB and DCRCB with $\epsilon=0.7$ and $\epsilon=1.5$, respectively, for the example in FIG. 2. Note that when $\epsilon<\epsilon_0=1.0$, the RCB and DCRCB signal power estimates are not as accurate as when $\epsilon>\epsilon_0$, but the peaks are sharper.

Figure 5:
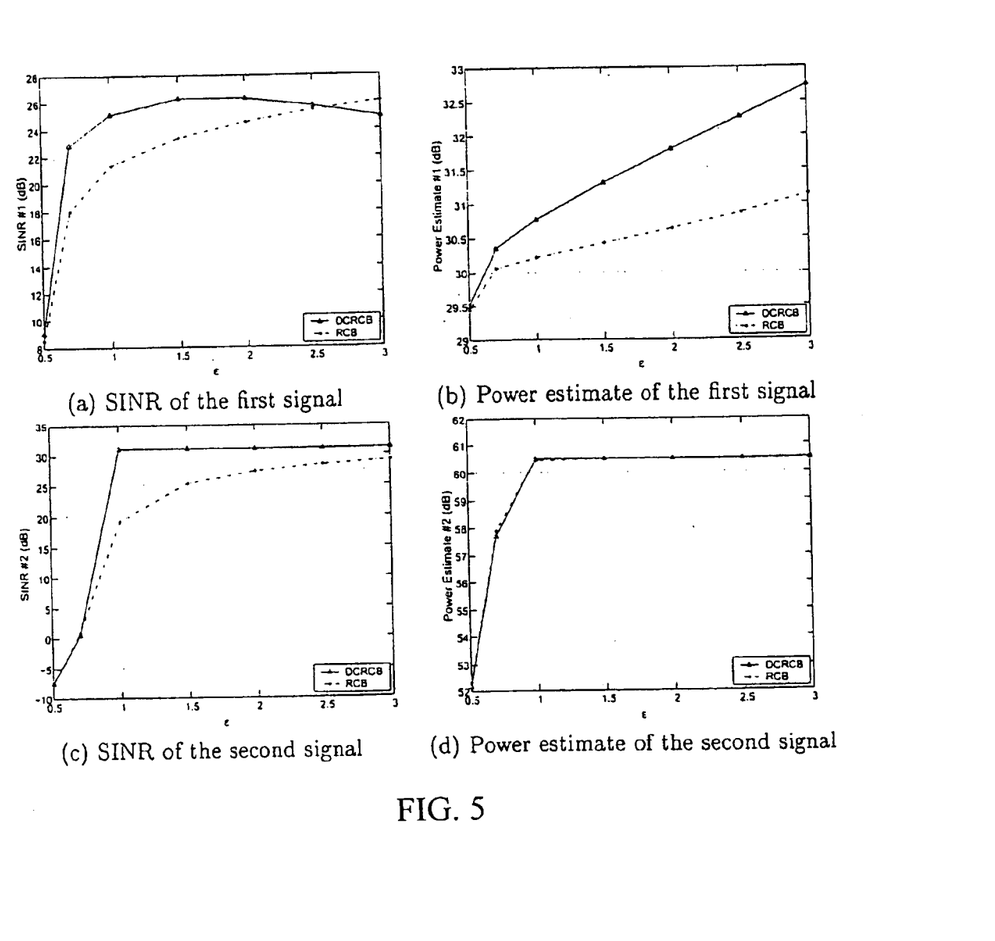

In FIG. 5, the SINRs and the signal power estimates for the five incident signals are compared, as functions of c, obtained via using RCB and DCRCB. FIGS. 5(a), 5(c), 5(e), 5(g), and 5(i) show the SINRs of the five signals as functions of c. FIGS. 5(b), 5(d), 5(f), 5(h), and 5(j) show the power estimates of the five signals as functions of $\epsilon$, with the horizontal dotted lines denoting the true signal powers. Note that except for the 4th signal, the SINR of DCRCB is in general higher than that of RCB when $\epsilon$ is not too far from $\epsilon_0$. Hence for applications requiring waveform estimation, the former may be preferred over the latter if $\epsilon_0$ is known reasonably accurately. For the 2nd signal in FIG. 5(c), the DCRCB uses the scaled principal eigenvector as the estimated steering vector. For this case, DCRCB is always better than RCB, no matter how $\epsilon$ is chosen. On the other hand, for signal power estimation RCB in general outperforms DCRCB and hence may be preferred in applications such as acoustic imaging where only the signal power distribution as a function of angle or location is of interest. Also the larger the $\epsilon$, the more RCB and DCRCB will overestimate the signal power. Therefore, if possible, $\epsilon$ should not be chosen much larger than $\epsilon_0$.

In the next examples, the 5th signal from 40° is treated as the signal of interest (SOI). The other 4 signals are considered as interferences. In the following figures for the SOI power estimates, the dotted lines correspond to the true SOI power.

Figure 6:
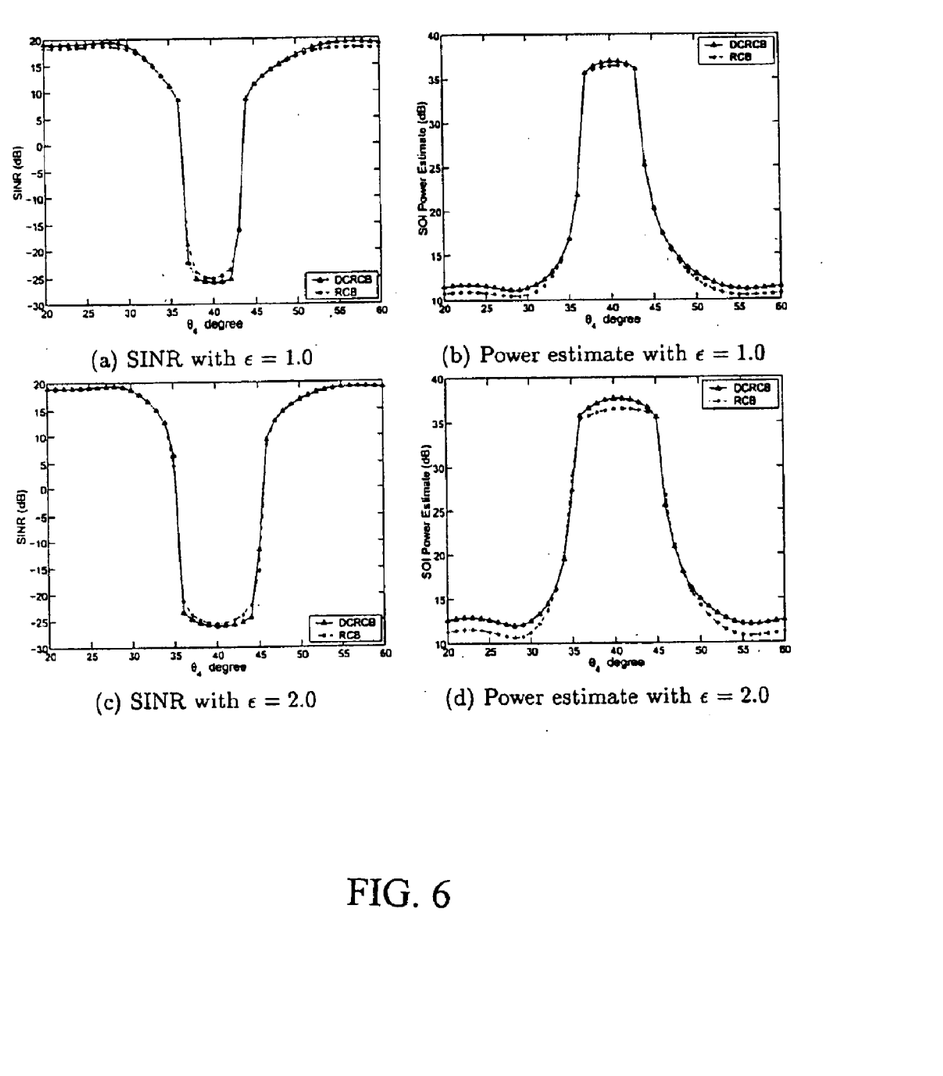

First, a scenario is considered where the fourth signal changes its direction of arrival from 20° to 60° with the directions of arrival of the SOI and the other three interfering signals fixed. The array suffers from the same calibration error as in FIG. 2. Note from FIG. 6 that when the direction of arrival of an interference signal becomes too close to that of the SOI, both RCB and DCRCB suffer from severe performance degradations in both SINR and SOI power estimation accuracy. As expected, the larger the ϵ used the weaker the interference suppression capability of both methods when an interfering signal is nearby the SOI.

Figure 7:
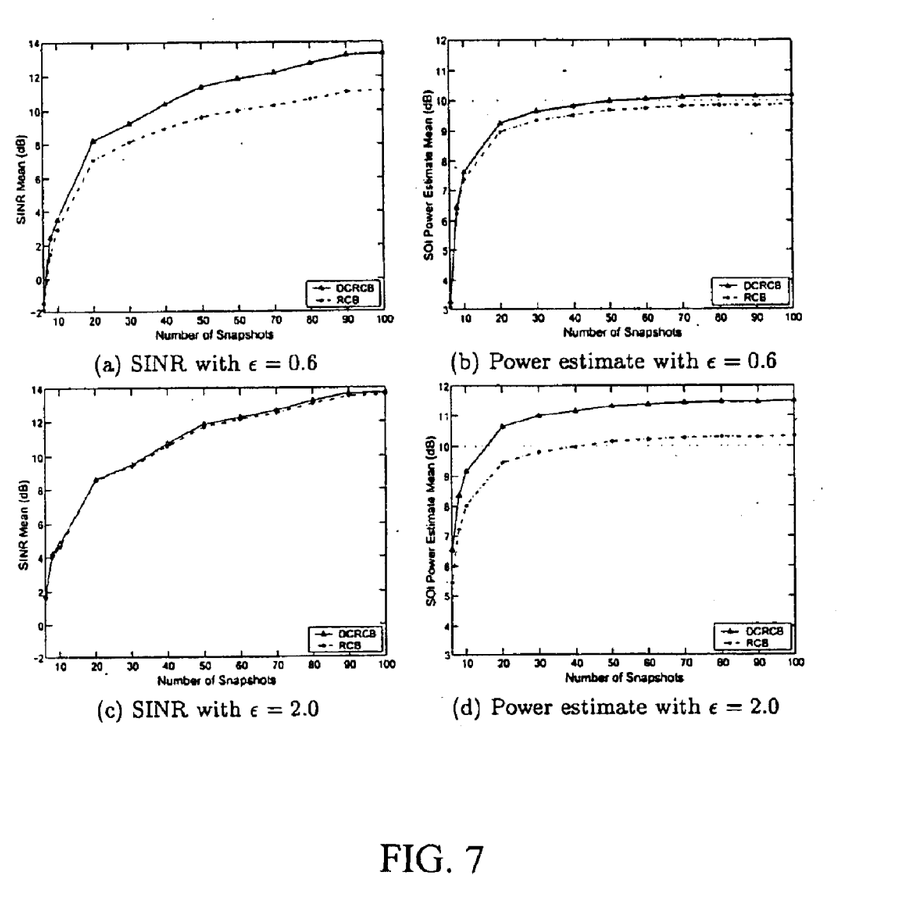

The effect of the number of snapshots N on the SINR and SOI power estimation accuracy of RCB and DCRCB are considered when the sample covariance matrix $\hat{R}$ from $$\hat{R} = \frac{1}{N}\sum_{n=1}^{N} x_n x_n^*$$

is used in lieu of the theoretical array covariance matrix R. It is assumed that the steering vector error is due to an error in the SOI pointing angle, which is assumed to be $\theta_s+\Delta$, where $\theta_s$ is the true arrival angle of the SOI. In this example, $\epsilon_0=0.5603$ corresponds to $\Delta=2.0°$. 100 Monte-Carlo simulations are used to obtain the mean SINR and SOI power estimates. It is worth noting that both RCB and DCRCB allow N to be less than the number of array elements M. We use N=6 and N=8 is used for the N<M case in this example. For DCRCB, when the condition $$Re(\bar{a}^*a)<M-\epsilon/2$$

is not satisfied, the SOI power estimate is calculated by $\sigma_0^2 = 1/M$. Note from FIG. 7 that the convergence properties of both methods are quite good and somewhat similar. Since the errors between $\hat{R}$ and R can be viewed as equivalent steering vector errors, ϵ should be chosen larger than $\epsilon_0$, especially for small N.

Figure 8:
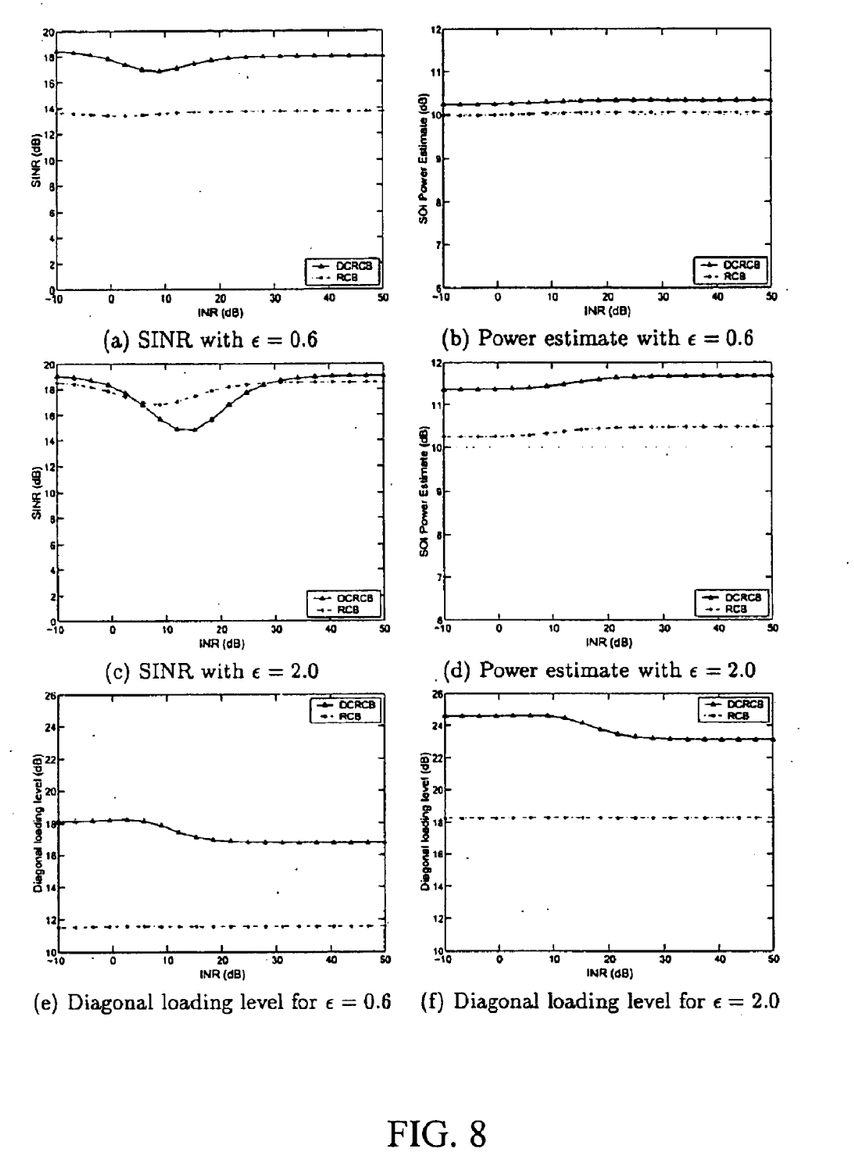

The performances of RCB and DCRCB is now compared when the power of the fourth signal is varied. As in the previous example, $\epsilon_0=0.5603$ corresponds to $\Delta=2.0°$. The INR in FIG. 8 refers to the ratio between the 4th signal power and the noise power. Note from FIG. 8(a) that the SINR of DCRCB is much better than that of RCB when ϵ=0.6. However, when ϵ is large, for example when ϵ=2.0 as in FIG. 8(c), and when the INR is comparable to the SNR of the SOI, DCRCB has lower SINR than RCB. From the diagonal loading levels of the methods shown in FIGS. 8(e) and 8(f), it is interesting to note that the diagonal loading level of RCB when ϵ=2.0 is about the same as that of DCRCB when ϵ=0.6. As a result, the SINR and SOI power estimate of RCB when ϵ=2.0 are about the same as those of DCRCB when ϵ=0.6. Note also from FIG. 8 that when the INR becomes close to the SNR, there is a performance drop in the array output SINR. One possible explanation is that when the INR is much smaller than the SNR, its impact on the SOI is small. As the INR increases, it causes the SINR to drop. As the INR becomes much stronger than the SNR, the adaptive beamformers start to form deep and accurate nulls on the interference and as a result, the SINR improves again and then becomes stable.

Figure 9:
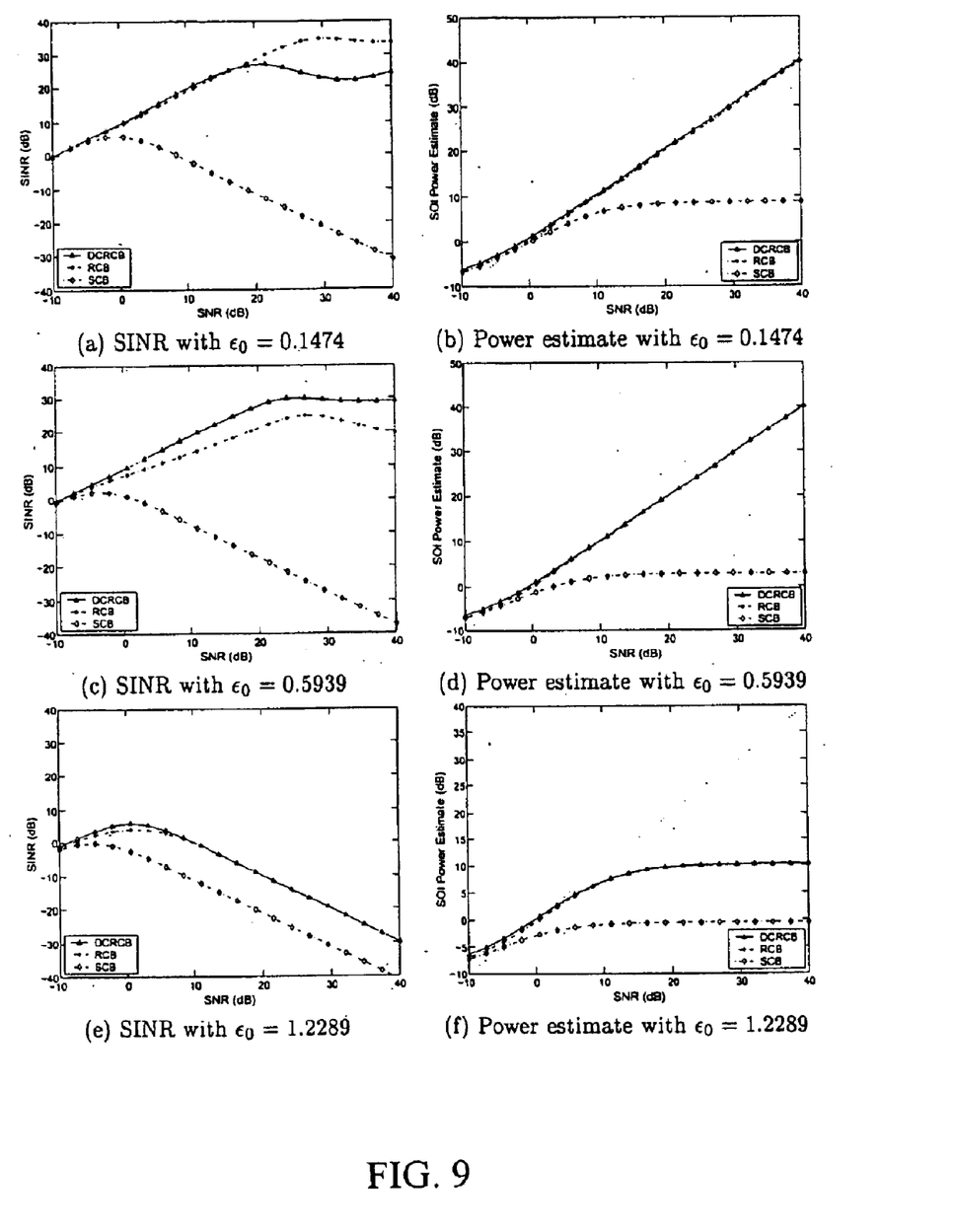

Next, the case where the SOI power varies is considered. ϵ=0.6 is chosen and three cases are considered: $\Delta=-1.0°$, $-2.0°$, and $3.0°$, with the corresponding $\epsilon_0$ being 0.1474, 0.5939, and 1.2289, respectively. FIG. 9 shows that as long as ϵ is greater than $\epsilon_0$ and, the SOI SNR is medium or high, the SOI power estimates of RCB and DCRCB are excellent.

Their SINR curves are also quite high, but they drop when the SOI SNR approaches the INR of one of the interfering signals. One possible explanation is given at the end of the previous paragraph. FIGS. 9(e) and 9(f) show that when ϵ is smaller than $\epsilon_0$, the performances of both RCB and DCRCB drop drastically as the SOI SNR increases from moderate to high. This is because the SOI is suppressed as an interference for this case. Note that RCB and the DCRCB according to the invention significantly outperform the SCB in SINR and SOI power estimates.

Figure 10:
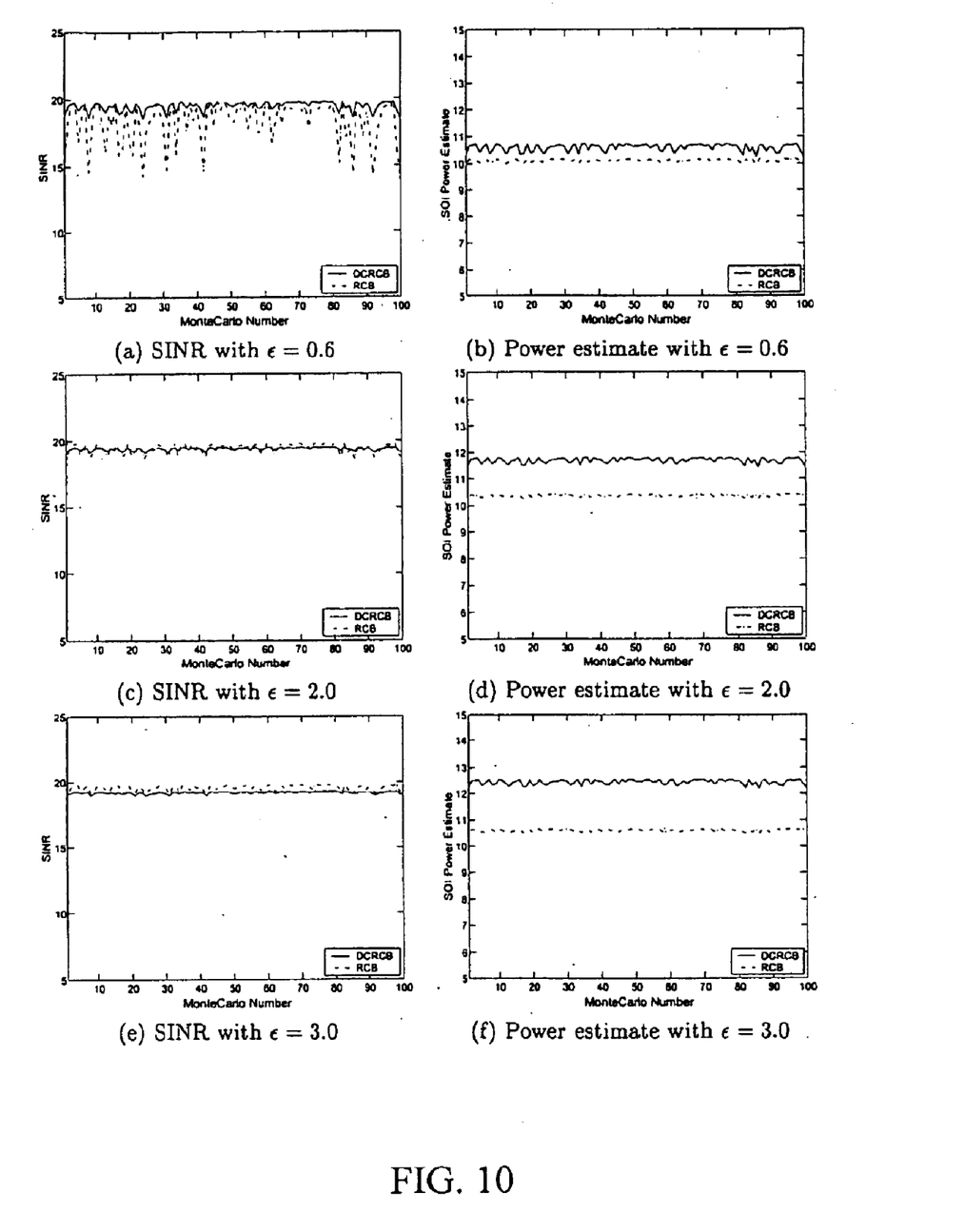

Finally, in the last two examples 100 Monte-Carlo simulations are used to compare the statistical performances of RCB and DCRCB. First, the true arrival angle of the fifth signal is uniformly distributed between 38° and 42° but it is assumed to be 40°. FIG. 10 compares the SINR and the SOI power estimates of RCB and DCRCB obtained in the 100 Monte-Carlo trials. Note that the SINR mean of DCRCB is about the same as that of RCB but the SINR variance of DCRCB is much smaller than that of RCB (especially when ϵ=0.6, which is quite tight since $0\leq\epsilon_0\leq0.5939$). Hence this example shows again that DCRCB may be preferred over RCB when higher array output SINR for waveform estimation is needed. On the other hand, the bias and the variance of the SOI power estimates of RCB are smaller than those of DCRCB. This is especially so for large ϵ; note that a large ϵ is not a problem here since the interfering signals are quite far away from the SOI. Hence this example also shows that RCB may be preferred over DCRCB in applications requiring accurate SOI power estimation including radar, acoustic, and ultrasound imaging.

Figure 11:
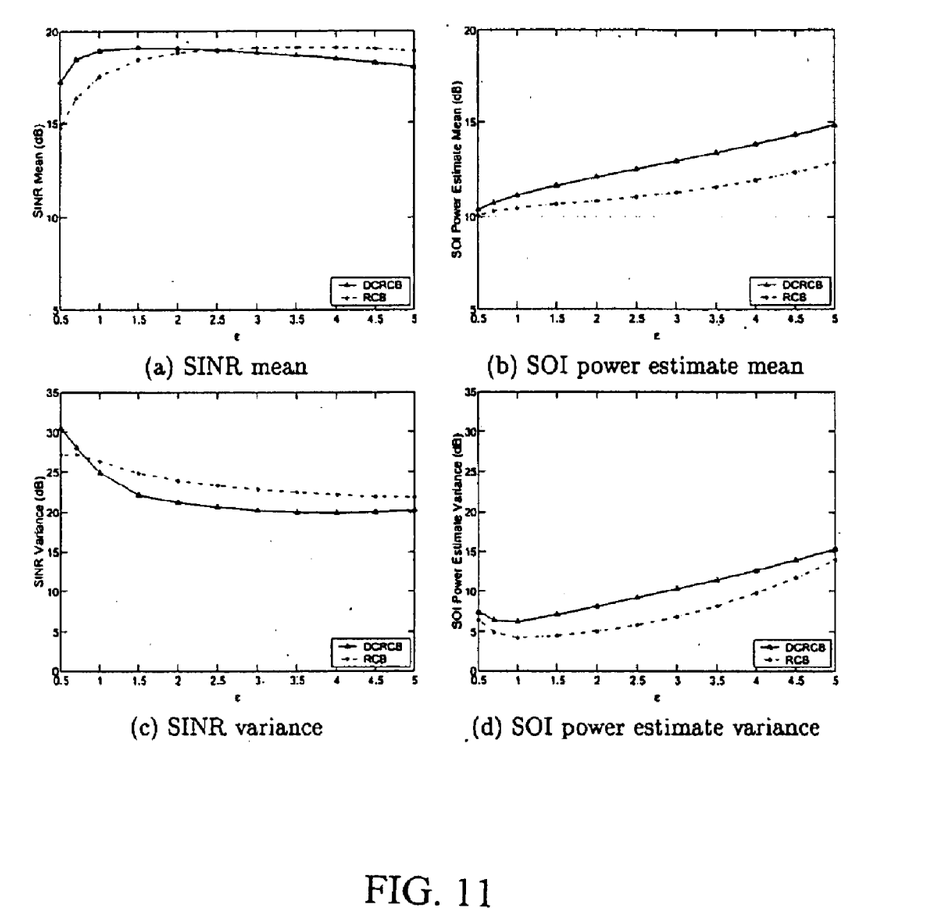

Next consider an example of array calibration error that consists of perturbing each element of the steering vector for each incident signal with a zero-mean circularly symmetric complex Gaussian random variable with a variance equal to 0.1. The perturbing Gaussian random variables are independent of each other. The calibration error is not scaled or normalized in any way and hence $0\leq\epsilon_0\leq\infty$. In FIG. 11, the means and variances of the SINR and SOI power estimates of RCB and DCRCB are compared, as functions of ϵ. The figure shows once again that with a reasonable choice of ϵ, the DCRCB according to the invention may be preferred for applications requiring high SINR whereas RCB may be favored for applications demanding SOI power estimation.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. A method for enhanced Capon beamforming, comprising the steps of:

providing a sensor array including a plurality of sensor elements, wherein an array steering vector corresponding to a signal of interest (SOI) is unknown;

bounding a covariance matrix fitting relation for said array steering vector by constraining said array steering vector using a constant norm and a spherical uncertainty set, and solving said matrix fitting relation to provide an estimate of said array steering vector.

2. The method of claim 1, further comprising the step of determining a power of said SOI, said step of determining power including adjustment for said estimated array steering vector.

3. The method of claim 2, further comprising the step of determining a direction of arrival (DOA) of said SOI from said SOI power.

4. The method of claim 1, wherein said method is used to determine a weight vector for said sensor array.

5. The method of claim 4, further comprising the step of determining a waveform of said SOI from said weight vector.

6. The method of claim 1, wherein said solving step comprises use of the Lagrange Multiplier Method.

7. The method of claim 1, wherein said sensor elements comprise antennas or ultrasound transducers.

8. A sensor-based system, comprising,
a sensor array including a plurality of sensor elements, wherein an array steering vector corresponding to a signal of interest (SOI) is unknown, and
a signal processor communicably connected to said plurality of sensor elements, said signal processor bounding a covariance matrix fitting relation for said array steering vector by constraining said array steering vector using a constant norm and a spherical uncertainty set, and solving said matrix fitting relation to provide an estimate of said array steering vector.

9. The system of claim 8, wherein said sensor system comprises at least one selected from the group consisting of radar, cellular communications, sonar and acoustic imaging.

* * * * *